Feb. 10, 1970    SHUJI HASEGAWA    3,494,485
CHIP UNLOADER FOR SHIPS

Filed July 3, 1968    2 Sheets-Sheet 1

INVENTOR:
SHUJI HASEGAWA
BY Howson & Howson
ATTYS.

Feb. 10, 1970   SHUJI HASEGAWA   3,494,485
CHIP UNLOADER FOR SHIPS
Filed July 3, 1968   2 Sheets-Sheet 2

INVENTOR:
SHUJI HASEGAWA
BY
Howson & Howson
ATTYS.

United States Patent Office 3,494,485
Patented Feb. 10, 1970

3,494,485
CHIP UNLOADER FOR SHIPS
Shuji Hasegawa, Tamano, Japan, assignor to Mitsui
 Shipbuilding & Engineering Co. Ltd., Tokyo,
 Japan, a corporation of Japan
Filed July 3, 1968, Ser. No. 742,453
Claims priority, application Japan, Oct. 19, 1967,
42/88,880
Int. Cl. B36b 27/22; B66b 17/00
U.S. Cl. 214—15                           1 Claim

ABSTRACT OF THE DISCLOSURE

An unloader for bulk material from ship holds in which a grab bucket operates to pick up bulk material from the hold and discharge it directly onto a series of conveyors which are positioned horizontally on a gantry structure immediately above the hold opening and which operate to transfer the material discharged thereon laterally onto a conveyor running longitudinally parallel to the path of movement of the gantry. A gate is provided for regulating the discharge of the bulk material from the multiple conveyors onto the longitudinal conveyor.

---

This invention relates to a chip unloader for ship.

An object of this invention is to provide a chip unloader which may be operated efficiently so as to unload rapidly chips such as lumber chips.

Another object of this invention is to provide a chip unloader having a gantry structure decreased in height in order not to obstruct the view from the bridge of the ship.

These and other objects of this invention and the feature and detail of construction and operation thereof are hereinafter set forth and described and shown in the accompanying drawings, in which.

Figure 1:
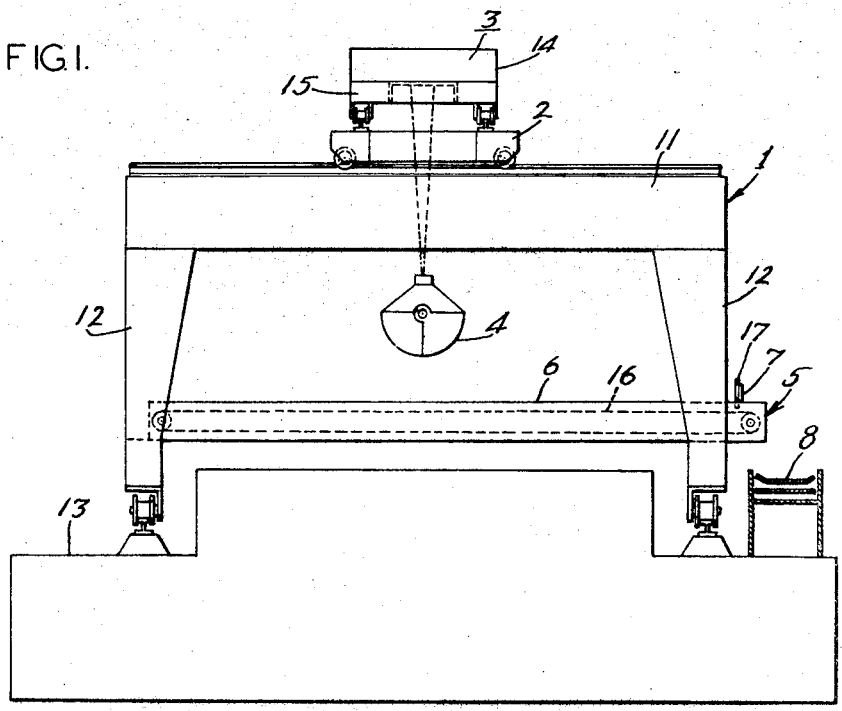
FIG. 1 is a front view of a chip unloader in accordance with this invention.
Figure 2:
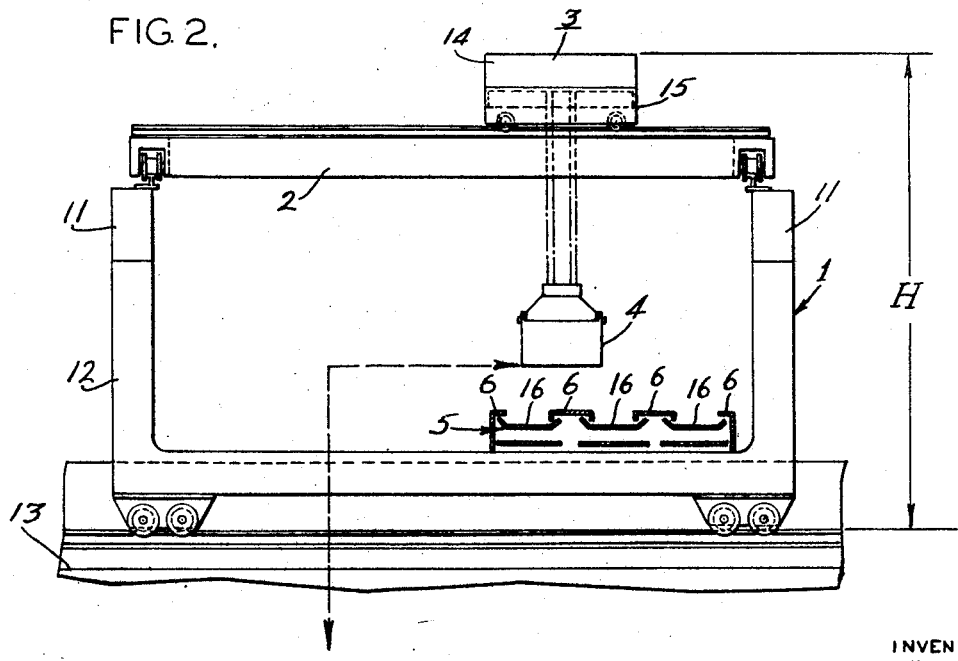
FIG. 2 is a side elevational view of FIG. 1.
Figure 3:
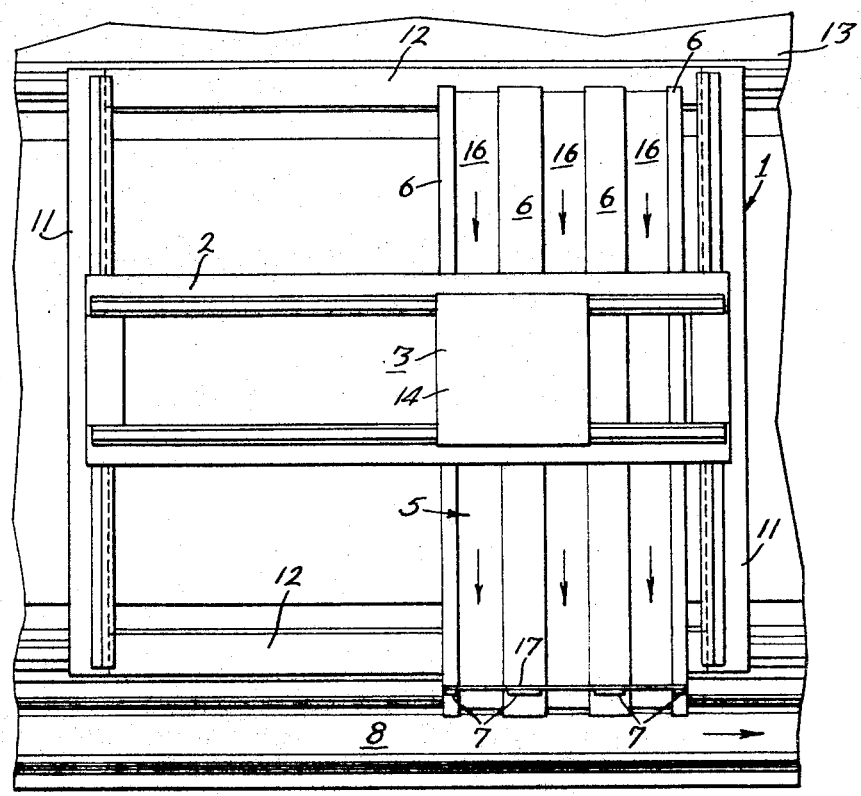
FIG. 3 is a plane view of FIG. 1.

Referring now to the drawings, and particularly to FIG. 1 to FIG. 3, a gantry structure 1 comprises two girders 11 and two U-shaped frames 12 for supporting the girders and is provided on the deck 13 to be longitudinally moved in the direction of stem or stern. On the two girders 11, an overhead crane girder 2 is provided for laterally traveling. A trolley 3 is provided with a hoisting and opening-shutting device 14 for a grab bucket 4 and a traveling device 15 for transversely running on the overhead crane girder 2; 5 is a multiple conveyor comprising parallel arranged plural belt conveyors 16 (hereinafter called inside conveyor) and designed to have a sufficient width to receive the chips fallen from the grab bucket 4 when opened. In order to prevent the chips from falling through the gaps between belt conveyors, covers 6 are provided over the gaps; 7 is a gate having a vertically adjustable plate 17 which is adapted to control the exhaust of the chips from the inside conveyor 5 to continuously feed the chips to the next step conveyor 8.

In operation, the opened grab bucket 4 is lowered into the hold, operated to grasp the chips such as lumber chips, and then lifted. The trolley 3 is, in turn, traveled on the overhead crane girder 2 toward the inside conveyor 5 and stopped when the grab bucket 4 reached to the position above the nearly central portion of the inside conveyor 5. At this position, the grab bucket 4 is opened, the chips are fallen on the inside conveyor 5. The trolley 3 is then returned to the initial position with the bucket 4 opening. Subsequently, above mentioned operation is repeated. Thus the chips in the hold are successively conveyed onto the inside conveyor 5.

The chips fallen on the inside conveyor 5 are continuously fed to the conveyor 8 with regulating of feeding by the gate 7 on their way. The chips, in turn, are exhausted out of the ship by the conveyor 8.

Figure 4:
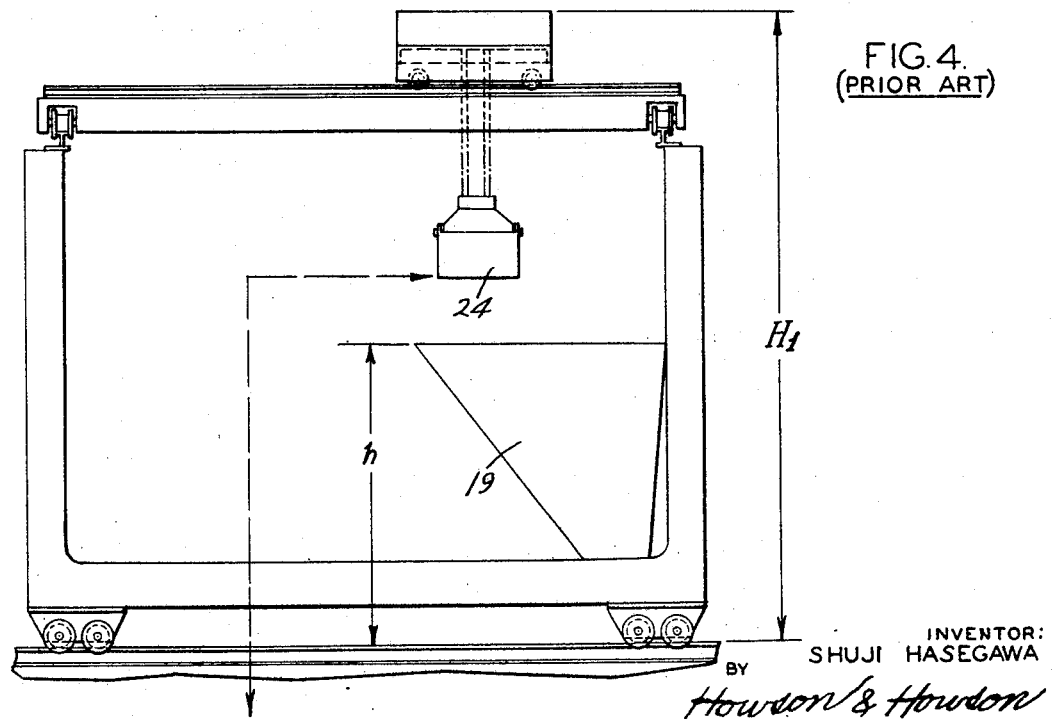
FIG. 4 is a side elevational view of a conventional chip unloader.

In the conventional chip unloader, whichever the gantry crane type or the jib crane type, there is provided a funnel shaped hopper 19 as shown in FIG. 4. The chips grasped by the grab bucket 24 are fallen into the hopper 19 and fed onto a conveyor (not shown) through the bottom opening of the hopper 19. In this instance, the hopper has a good height h, and the path of the grab bucket becomes longer, which results in reduced efficiency of unloading of chips. Moreover, the visibility from the bridge of the ship is bad, because the total height $H_1$ is increased.

In accordance with this invention, the path of the grab bucket is shortened, since the inside conveyor 5 is employed so that the height of the conveyor may be decreased. Furthermore, since the total height H may be decreased, the visibility from the bridge of the ship is not obstructed.

I claim:

1. Apparatus for unloading wood chips and similar bulk material from the hold of a cargo ship having a deck with openings into the hold disposed longitudinally thereof, a gantry structure having overhead crane girder means extending across the hold openings; track means on opposite sides of said hold openings mounting said gantry structure for movement longitudinally of said deck along said hold openings; a grab bucket mounted on said crane girder means for both longitudinal and transverse movement relative to said gantry structure; a multiple conveyor comprising a plurality of side by side conveyors mounted on said gantry in substantially horizontal position across the full width of the hold opening and having a longitudinal dimension in excess of the longitudinal dimension of the grab bucket and leaving a free space of similar longitudinal dimension within said gantry structure so that the grab bucket may be displaced vertically through said free space into and out of the hold opening and, when elevated, displaced horizontally longitudinally to overlie said multiple conveyor for discharging bulk material therefrom directly onto said conveyor; a longitudinal conveyor mounted on said deck parallel to the track means for said gantry to receive material discharged from said multiple conveyor; and gate means to regulate the discharge of material from said multiple conveyor onto said longitudinal conveyor.

References Cited
UNITED STATES PATENTS

| | | |
|---|---|---|
| 1,808,862 | 6/1931 | Peterson. |
| 2,715,950 | 8/1955 | Law. |
| 2,827,181 | 3/1958 | Bartenfield. |

GERALD M. FORLENZA, Primary Examiner

F. E. WERNER, Assistant Examiner

U.S. Cl. X.R.
214—89